(12) United States Patent
Cheng et al.

(10) Patent No.: US 7,797,340 B2
(45) Date of Patent: Sep. 14, 2010

(54) METHOD AND SYSTEM FOR SEARCHABLE WEB SERVICES

(75) Inventors: Doreen Cheng, San Jose, CA (US); Yu Song, Pleasanton, CA (US); Swaroop Kalasapur, Sunnyvale, CA (US); Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 515 days.

(21) Appl. No.: 11/818,881

(22) Filed: Jun. 15, 2007

(65) Prior Publication Data

US 2008/0313190 A1    Dec. 18, 2008

(51) Int. Cl.
G06F 17/30    (2006.01)
(52) U.S. Cl. .................. 707/781; 707/770; 707/999.01
(58) Field of Classification Search .................. 707/100, 707/102, 781; 709/203
See application file for complete search history.

(56) References Cited

U.S. PATENT DOCUMENTS 7,356,562 B2 *  4/2008  Yoon ........................ 709/203
7,404,189 B2 *  7/2008  Benedetti .................... 719/317
7,457,815 B2 * 11/2008  Hsu et al. .................... 707/102

OTHER PUBLICATIONS

Universal Description, Discovery and Integration (UDDI) based registry, http://uddi.xml.org/, downloaded Sep. 19, 2008.

* cited by examiner

Primary Examiner—Apu M Mofiz
Assistant Examiner—Monica M Pyo
(74) Attorney, Agent, or Firm—Kenneth L. Sherman, Esq.; Michael Zarrabian, Esq.; Myers Andras Sherman LLP

(57) ABSTRACT

A method and system for searching for Web services with a search engine is described. Information pertaining to Web services is gathered from a publisher or through the use of a publication tools manager. Service definition files are constructed based on the gathered information, and are stored in a searchable service definition file. Service consumers then search for Web services stored in the service definition file via a search engine. Optionally, evaluation information related to the Web services is obtained and also stored in a searchable service definition file.

13 Claims, 6 Drawing Sheets

Items preceded with * are mandatory

*Title:

[ ]

* URL of the service definition file:

[ ]

* Categories of the service:

[ ]

Functional description of the service:

[ ]

Execution environment of the service:

[ ]

Additional information:

[ ]

( Publish )     ( Exit )

FIG. 3

Items preceded with * are mandatory

*Title:

[　　　　　　　　　　　　　　　]

URL of the service definition file:

[　　　　　　　　　　　　　　　]

Categories of the service:

[　　　　　　　　　　　　　　　]

H: high, M: medium, L: low:

Performance [H] [M] [L]　　Support [H] [M] [L]
Availability [H] [M] [L]　　Cost [H] [M] [L]
Stability [H] [M] [L]　　Resource Consumption [H] [M] [L]

Overall Satisfaction [H] [M] [L]

Additional information:

[　　　　　　　　　　　　　　　]

( Publish )　　( Exit )

400
FIG. 4

METHOD AND SYSTEM FOR SEARCHABLE WEB SERVICES

FIELD OF THE INVENTION

The present invention relates to searching for services using computer networks and in particular, searching for Web services.

BACKGROUND OF THE INVENTION

With the proliferation of services over the Internet, the need for managing Web services has been on the rise. Web services are software services (i.e., services provided by a software module; e.g., a translation service that translates an English text file into a Chinese text file). The most prominent approach for managing Web services utilizes a Universal Description, Discovery and Integration (UDDI) based registry. UDDI is a standard for publishing and locating information about Web services, using an information framework for description and classification of information such as Web services, and interfaces for the Web services.

However, the UDDI-based Web service has several shortcomings. First, the UDDI-based approach requires the use of a UDDI-based database. The added cost prevents many small service providers from using UDDI-based registries. Further, UDDI-based Web services are not discoverable by general-purpose search engines (e.g., Google). This is because a service provider publishes a service by registering it with a UDDI-based registry, and a user must search the UDDI database of the registry itself to find such services. Although a Web-based interface can be provided for such searching, a general-purpose search engine cannot directly reach and search such as a UDDI database.

Further, the UDDI uses Web Services Description Language (WSDL) to describe interfaces to Web services, which makes discovering and selecting services difficult for users. This is because when a user needs to utilize a service, the user typically attempts to find the service by describing its purpose and/or functionality. However, services published using the WSDL typically only define service invocation interfaces without having descriptions about their purposes and functionalities, which makes discovering and selecting services difficult for a user.

In addition, when selecting services using a UDDI, a user often needs to consider other factors such as cost, stability, support, performance and resource consumption. Although UDDI-based Web service registries may contain some of that information, they are not easily accessible, which further impedes usage/acceptance of these services. Further, a UDDI-based registry only provides mechanisms for service providers to publish/upload their services, without means for users to provide feedback/evaluation/rating of the services. As a result, out-of-date services often frustrate users, and selecting useful services from a UDDI database requires a significant amount of user time and effort.

There have been attempts in using a Really Simple Syndication (RSS), used for content distribution, to make WSDL-based Web services searchable by general-purpose search engines. In such attempts, the URL of a service WSDL file is embedded in an item of a RSS feed which can then be discovered by the general-purpose search engines. However, such a RSS-based Web service discovery requires the user to have a RSS reader/aggregator on an accessing device and to subscribe to a RSS feed, such that the changes in the feed are pushed to the user device. Further, although users can voice their feedback about services provided by a RSS-based Web service discovery, such approaches do not easily organize the feedback and associate the feedback with corresponding services for easy access in selecting wanted/intended services. Additionally, such mechanisms do not enable the users to describe the purpose/functionality of a service. There is, therefore, a need for a method and system for searchable Web services that addresses the above shortcomings.

BRIEF SUMMARY OF THE INVENTION

The present invention provides a method and system for searchable Web services, which make Web services searchable by search engines. In one embodiment, a process for a searchable Web service involves gathering service information, including definition and description of the Web service, using the gathered information for constructing a service definition file in a pre-defined format, and enabling one or more search engines to discover information in the service definition file.

In some embodiments, the present invention also enables publishing searchable Web services and associated information for evaluating the Web services. The Web services and related information can be provided by a Web service provider or extracted from an existing Web service registry.

These features lower the cost of publishing and maintaining Web services, enable a user feedback collection for a web service and make user feedback information searchable in service selection. Unlike the RSS-based Web service discovery, the present invention only requires the use of a search engine or a software agent to search for services.

These and other features, aspects and advantages of the present invention will become understood with reference to the following description, appended claims and accompanying figures.

BRIEF DESCRIPTION OF THE DRAWINGS

FIG. 3 shows a user interface template for service providers to publish services, according to an embodiment of the present invention.

FIG. 4 shows a user interface template for users to enter evaluation information about a Web service, according to an embodiment of the present invention.

DETAILED DESCRIPTION OF THE INVENTION

The present invention provides a method and system to make Web services searchable by search engines. The present invention also enables the publishing of searchable Web services and associated information for evaluating the Web services. The Web services and related information can be provided by a Web service provider or extracted from an existing Web service registry.

Figure 1:
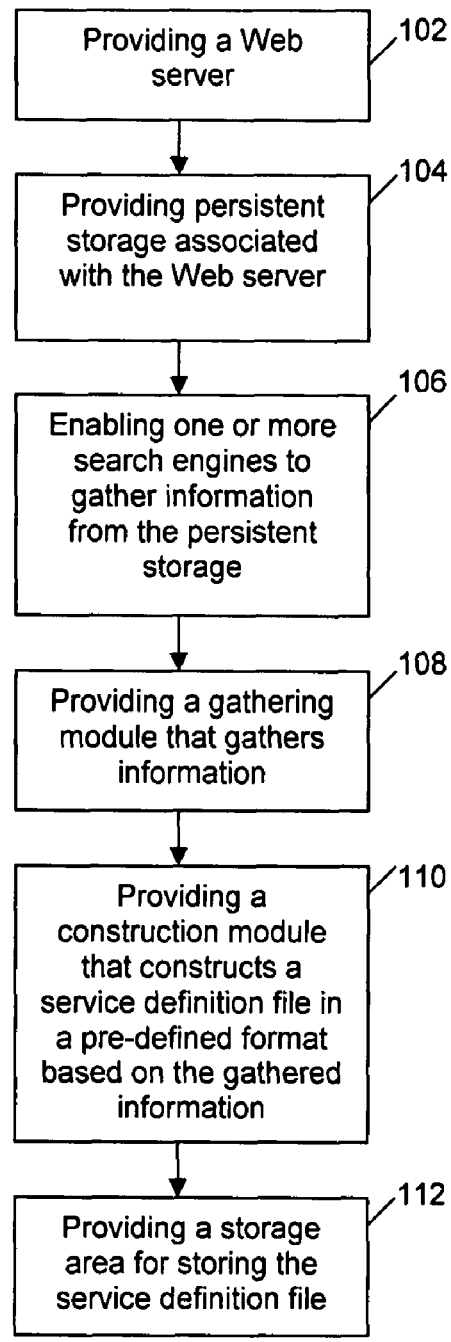
FIG. 1 shows a flowchart of the steps of a process for searching Web services, according to an embodiment of the present invention.

FIG. 1 shows a flowchart of a process 100 for searching Web services, according to an embodiment of the present invention, including the steps of:

Step 102: Providing a Web server.

Step 104: Providing a persistent storage associated with the Web server.

Step 106: Enabling one or more search engines to discover information from the persistent storage through the Web server.

Step 108: Providing a gathering module that gathers service information including a definition and description of a Web service (i.e., software service).

Step 110: Providing a construction module that uses the gathered information to construct a service definition file in a pre-defined format.

Step 112: Providing a storage area in the persistent storage for storing the service definition file such that a search engine, through the Web server, can discover services defined by the definition file stored in said storage area of the persistent storage.

A publisher can use a browser to access the gathering module to enter the definition and description information of a Web service and publish the service in the storage area. A user can then use a search engine to find the Web service in the storage area. The user can further enter feedback about the service and search for feedback from other users for Web service evaluation purposes.

Examples of such a Web server include an open-source Apache server, configured to operate according to the present invention, or a Boa server. Examples of a persistent storage associated with a Web server include a directory or a file folder of a file system.

An example of enabling a search engine to search the persistent storage includes submitting the address (e.g., URL) of the persistent storage to the search engine either manually, or using a tool such as NetMechanic's Search Engine Starter.

An example of the gathering module includes a service publication tools module 202 (see FIG. 2) that provides user interfaces (UIs) to guide a service provider to enter relevant information for a Web service. The publication software can also provide interfaces for other software to provide information about the Web service.

An example of the construction module for constructing a service definition file includes a software integrator/publisher module 204 (see FIG. 2) which uses the information gathered by the publication software (i.e., the gathering module), stitches the gathered information together according to a pre-defined format and generates the service definition file. The integrator/publisher then stores the service definition file in the storage area so that a search engine can discover the service defined by the service definition file. Examples of the pre-defined format include the WSDL, other XML-based formats, etc.

The information gathered by the gathering module about a Web service must include the following types of information: (1) service definition information that defines how the service should be invoked (e.g., the function prototypes of the methods of the service) and (2) information that indicates to which categories a service belongs (at least one category must be included). Preferably, the publisher also provides functional descriptions about the Web service so that it is easier for a user to use search engines to find the service.

The information gathered about a Web service can also include one or more of the following types of information: (1) information that describes the execution environment required by the Web software service (e.g., operating systems, storage and CPU), (2) other information about the Web software service (e.g., cost, performance, support, reliability, availability and resource consumption), and (3) user evaluation/rating of the software service in various aspects (e.g., cost, performance, support, reliability, availability and resource consumption), etc.

Web browsers can be used for gathering information about Web services and browsing information about Web services. Other implementations are also possible, as known by the people skilled in the field.

The process 100 may also optionally provide one or more of: (1) a browser for browsing information, such as that stored in an optional database (if the browser is built as the front end of the database) and (2) a dynamic tool generator for dynamically generating software tools for entering evaluation information for the service.

The construction module for constructing service definition files may optionally support one or more of the following functions: (1) storing information in a persistent storage in a pre-defined format, which storage may provide an interface for querying/retrieving the stored information (e.g., SQL-based databases and UDDI-based databases) and (2) accepting user evaluation information as input and modifying the corresponding service description file to reflect the evaluation information and/or storing the evaluation information in a persistent storage if such storage exists.

The evaluation software generated by the dynamic tool generator performs the following functions: (1) gathering evaluation information about the service, and (2) interacting with the constructed definition files to fetch information from the persistent storage, if such storage exists, and outputting the information for use.

Figure 2:
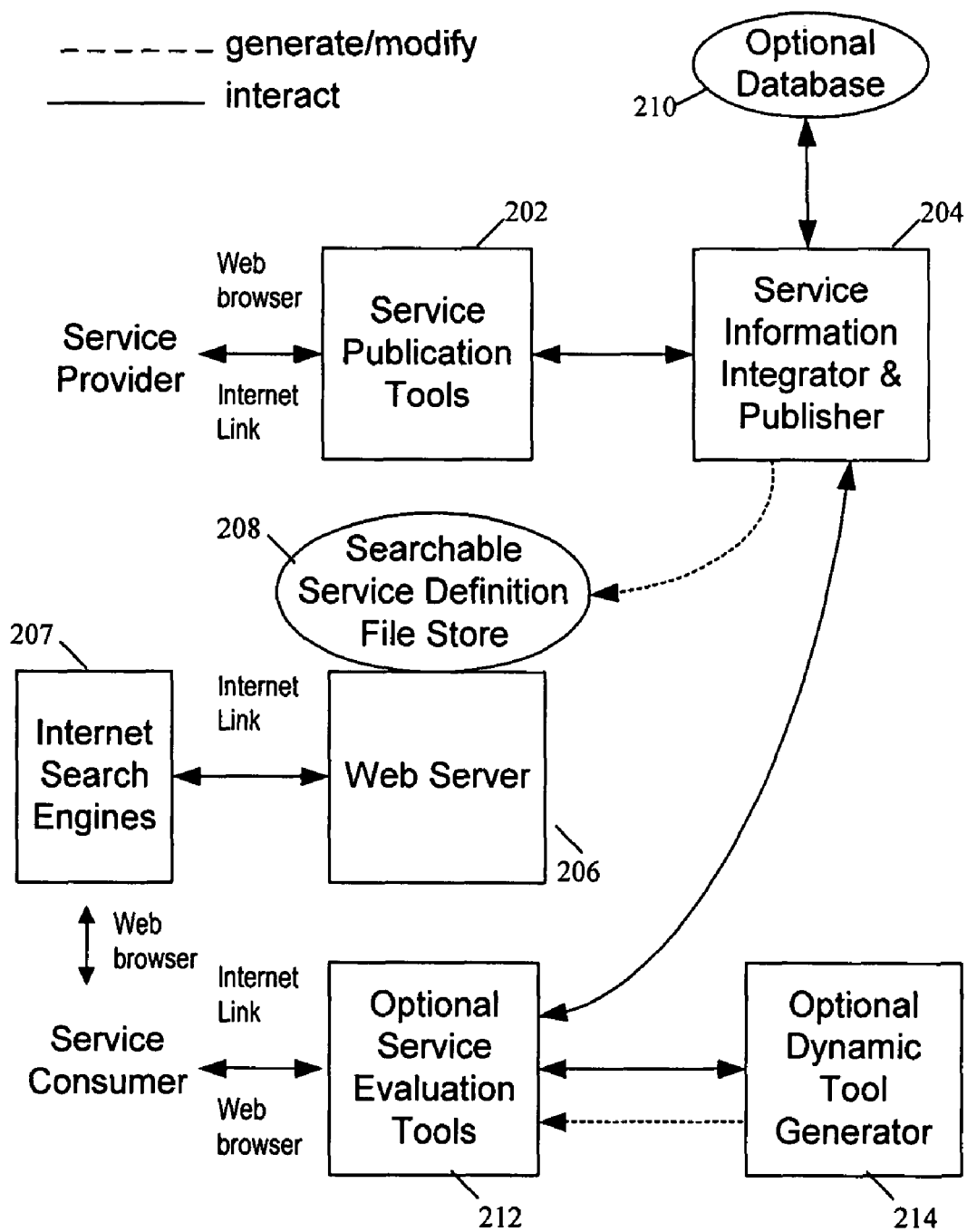
FIG. 2 shows a system implementing a process for searching Web services, according to an embodiment of the present invention.

FIG. 2 shows an example system 200 implementing the process 100 (FIG. 1) for searching Web services, according to the present invention. The system 200 includes a service publication tools module 202, a service information integrator & publisher module 204, a Web server 206 and a searchable service definition file storage 208. The system 200 can optionally include a database 210, a service evaluation tools module 212 and a dynamic tool generator 214. In FIG. 2, the solid double-headed arrows indicate interaction operations, whereas the dashed single-headed arrows indicate creation and/or modification operations. The modules 202, 204, 206, 208, 210, 212 and 214 can be implemented in a computer system or network (local or distributed) that can be connected to the Internet, thereby allowing a service customer (user) to use a Web browser to search for services via general search engines and find the service information in the storage 208 and (optional storage 210). Also, a service provider can use a Web browser to provide the service information.

A service provider can use a browser to access the service publication tools module 202 to enter service information for publishing a service. The service information integrator & publisher module 204 uses the gathered information to construct a service definition file in a pre-defined format, and stores the definition file constructed into the file storage 208.

A user (i.e., a service consumer looking for a Web service) utilizes the search engines 207 to access the Web server 206 to search the service information, including evaluations, in the storage 208. The user can further enter and search for service evaluations using the service evaluation tools module 212, which can either be manually developed or automatically generated by the tool generator 214.

As noted, the Web server 206 can be a standard Web server such as Apache, Boa and many others, configured to operate according to the present invention. As such, the Web server 206 enables typical search engines 207 on the Internet (e.g., Google, Yahoo) to reach and gather the information in the searchable service definition file storage 208, such that the services in this storage 208 can be discovered by users utilizing general-purpose search engines 207.

The service publication tools module 202 provides UIs for service providers to publish services with. The service publication tools module 202 gathers the input from the UIs and outputs the gathered information for use by the service information integrator & publisher module 204. Preferably, the service publication tools module 202 mandates that the service providers provide certain types of information while leaving other types of information optional.

FIG. 3 shows an example of such a UI 300 for service providers to publish services, wherein the service title, category and URL are mandatory, and other information (e.g., a functional description of the service, an execution environment of the service, additional information) is optional. Upon entering the information, the service provider pushes a "Publish" button to publish the service information. The information is used to increase the probability of discovering the right services using the search engines 207. The module 202 may further support functions for query and retrieval of the information regarding one or more services stored in the system 200 by interacting with the service information integrator & publisher module 204.

The service information integrator & publisher module 204 receives the service information from the service publication tools module 202 and constructs a definition file for the service according to a pre-defined format, as described. The service information integrator & publisher module 204 then stores the definition file in the searchable service definition file storage 208. When the optional database 210 is used, the service information integrator & publisher module 204 also stores the service information in the database 210.

The service information integrator & publisher module 204 can also automatically fetch information about the service to be published from the database, and integrate the information with the information entered by the service provider to generate the definition file according to the defined format before storing the file in the storage 208. As an example, the database 210 can be SQL-based or UDDI-based. The service information integrator & publisher module 204 may further receive the output of the service evaluation tools module 212 (described below) for modifying the definition file of the service. When the database 210 is used, the service information integrator & publisher module 204 may use the information from the service evaluation tools module 212 to update the database 210, and it may also provide support for query and retrieval of the information stored in the database 210.

The service evaluation tools module 212 allows for the browsing of service information and also for entering evaluation information for a service. The service evaluation tools module 212 comprises a static component and a dynamic component, wherein the dynamic component is generated by the optional dynamic tool generator 214. The static component provides support for browsing the service information in the system 200, querying one or more of the services, and displaying the corresponding results. The static component also provides a mechanism (e.g. a URL, a button, a menu entry) to invoke said dynamic component. A typical use of the dynamic component is for a user to enter evaluation information. For example when an "eval" button is activated, the tool module 212 is informed to generate a UI for the user to enter evaluation information about a service.

The dynamic tool generator 214 accepts the input that indicates the need for generating the dynamic component and the UI. The input may also indicate the service whose evaluation information will be entered into the system 200. Upon receiving such input, the dynamic tool generator 214 generates a UI and related code for the user to enter evaluation information. The generated code may interact with the service information integrator & publisher module 204 to retrieve information related to the service and/or to store the information into the system 200 entered by the user.

FIG. 4 shows an example UI template 400 for users to enter evaluation information about a service. The indicators H (high), M (medium), and L (low) are used for coarse-level evaluation. Other UI indicators can also be used for fine-grained rating or for entering text descriptions. More metrics can also be added for evaluation. Similar UIs can be used to display ratings by all users or a selected subset of the users who have evaluated the same service. The evaluation can then be used for service selection.

When a web browser is used for gathering/presenting information from/to a user, the UI's should be encoded using a standard such as HTML. In addition, the web pages used by the tools should be organized and stored in a file system according to a standard Web definition so that they can be fetched through standard HTTP-based protocols.

Figure 5:
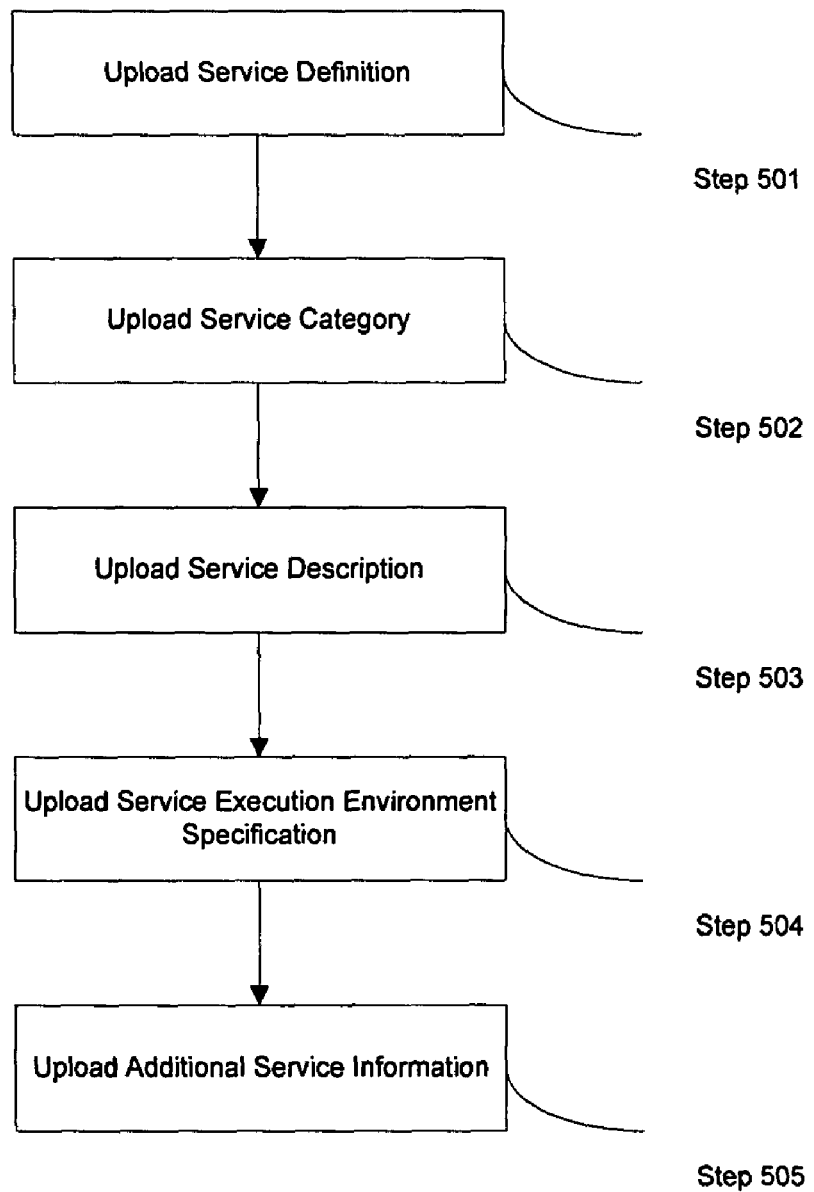
FIG. 5 shows a flowchart of steps of an example process implemented by the service publication tools module in FIG. 2, according to the present invention.
Figure 6:
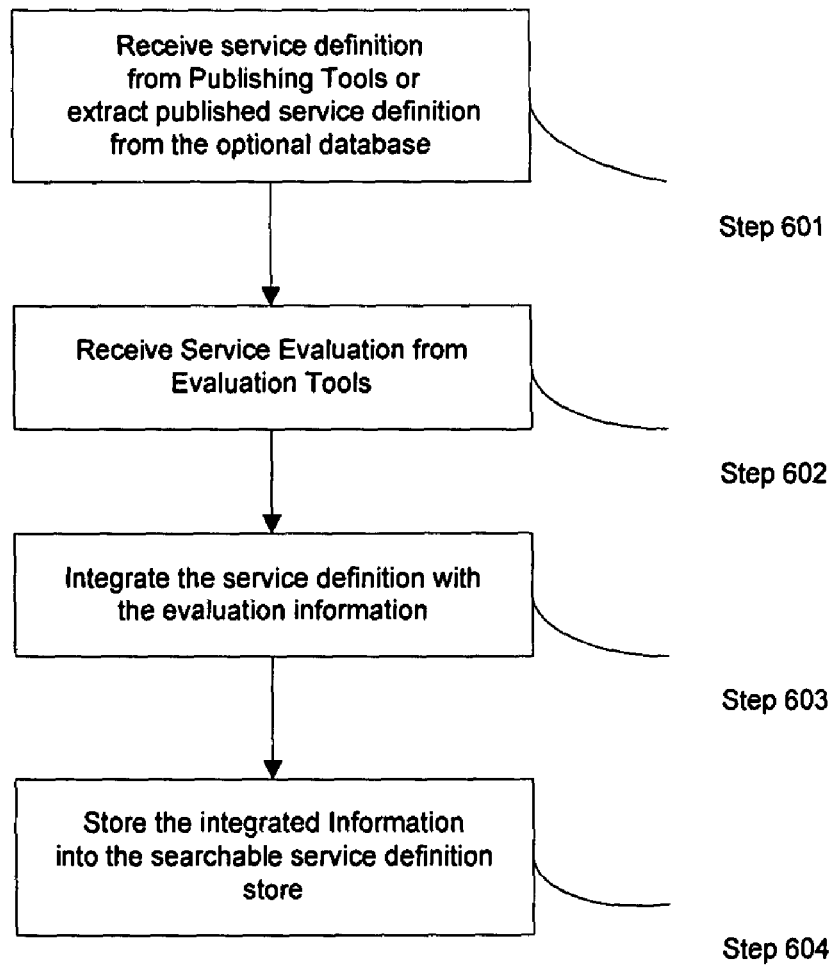
FIG. 6 shows a flowchart of steps of an example process implemented by the service information integrator & publisher module in FIG. 2, according to the present invention.

As shown by the example graphical UI 300 in FIG. 3, a user fills information in various fields of the UI 300 for a service, and the service publication tools module 202 (FIG. 2) extracts the service information from the fields of the UI 300 (e.g., Title, URL, Categories, Functional description information, Execution environment information, etc.) and passes them to the service information integrator & publisher module 204. The module 204 in turn follows the passed URL to obtain the WSDL file that describes the service. The module 204 then creates a HTML page and uses appropriate tags to encapsulate the content of various fields. For example, use <title> for the title, and use <document> for category, functional description, execution environment, and additional information. The module 204 then stores the Web page in the file store 208. FIGS. 5-6 below show flowcharts of example steps performed by the service publication tools module 202 and the service information integrator & publisher module 204, respectively.

FIG. 5 shows a flowchart of steps of an example process 500 implemented by the service publication tools module 202 (FIG. 2), according to the present invention:

Step 501: Upload Service Definition.
Step 502: Upload Service Category.
Step 503: Upload Service Description.
Step 504: Upload Service Execution Environment Specification.
Step 505: Upload Additional Service Information.

FIG. 6 shows a flowchart of steps of an example process 600 implemented by the service information integrator & publisher module 204 in FIG. 2, according to the present invention.

Step 601: Receive service definition from Publishing Tools or extract published service definition from the optional database.
Step 602: Receive Service Evaluation from Evaluation Tools.
Step 603: Integrate the service definition with the evaluation information.
Step 604: Store the integrated Information into the searchable service definition store.

In the system 200 (FIG. 2), a search engine 207, through the Web server 206, can discover the service defined by the definition file stored in said storage area of the persistent storage 208. The system 200 not only provides mechanisms for access to service information by a user, but it also allows access to the information through programming interfaces. The system 200 allows for the publishing of Web services that are searchable by general-purpose search engines on the Internet. Use of a database is optional, thus lowering the cost of publishing and maintaining published Web services. The system 200 also enables public evaluation of the Web services, as well as open-ended approaches. The evaluation can be used in service selection. The system 200 further enables associating user evaluations of a Web service with the service definitions. This association allows for easy access to the evaluation information during a service selection process. The system 200 further makes information about a service in an existing Web service registry searchable.

These features lower the cost of publishing and maintaining Web services, enable user feedback collection for a Web service and make user feedback information searchable and can be used in service selection. Unlike the RSS-based Web service discovery, the present invention only requires the use of a search engine or a software agent to search for services.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method for implementing a searchable Web service, comprising:
    employing a processor for:
    receiving service information and category information from a service provider for publishing a service;
    obtaining one or more of: service information describing the execution environment for the service; service cost; and user evaluation/rating of the service;
    constructing a service definition file in one or more of Web Services Description Languages (WSDL) and Extensible Markup Language (XML) based formats from the received service information;
    storing the service definition file into a searchable service definition file storage;
    storing the service information in a database;
    a service evaluation module processor employed for obtaining evaluation information for a service discovered by a Web server configured for allowing one or more search engines to discover the service based on the service definition file in the searchable service definition file storage, wherein the service evaluation module processor comprises a static component employed for supporting: browsing the service information, querying one or more services, and displaying the corresponding results on a user interface, wherein the service evaluation module processor further comprises a dynamic component employed for allowing a user to enter service evaluation information, wherein the static component service evaluation module processor is further employed for providing a mechanism to invoke said dynamic component of the service evaluation module processor;
    dynamically generating the dynamic component of the service evaluation module processor based on input indicating the need for generating the dynamic component;
    generating a user interface and related code for receiving service evaluation information from the user, wherein the generated code is configured for retrieving information related to the service and/or to store the information entered by the user;
    wherein the service defined by the service definition file in the searchable service definition file storage can be discovered by a service customer utilizing general-purpose search engines via the Web server by providing the address of a corresponding storage area in the searchable service definition file storage, to the one or more search engine to access the storage area, wherein the service evaluation information can be discovered by the service customer by utilizing the service evaluation module processor.

2. The method of claim 1 further comprising providing a gathering module that gathers service information from the service provider.

3. The method of claim 2 wherein:
    obtaining gathered service information includes providing a publication module for obtaining gathered service information from the service provider; and
    constructing the service definition file includes providing an integrator module that uses the gathered service information and integrates gathered service information according to WSDL and XML-based formats to generate a service description file.

4. The method of claim 2 wherein obtaining gathered service information further includes obtaining invocation information for the service.

5. The method of claim 2 further comprising providing a user interface for service providers to provide gathered service information and publish services.

6. The method of claim 1 wherein obtaining gathered service information further includes obtaining functional descriptions about the Web service.

7. The method of claim 1 wherein the storage area provides an interface for querying and retrieving stored information.

8. The method of claim 7, wherein the storage area comprises a Universal Description Discovery and Integration (UDDI) based database.

9. A system for searching Web services, comprising:
    a service publication tools module processor configured for receiving service information and category information from a service provider for publishing a service, wherein the service publication tools module processor is further configured for obtaining one or more of: service information describing the execution environment for the service; service cost; and user evaluation/rating of the service;
    a service information integrator and publisher module processor configured for constructing a service definition file in one or more of Web Services Description Languages (WSDL) and Extensible Markup Language (XML) based formats from the received service information, and storing the service definition file into a searchable service definition file storage;
    a database configured for storing the service information from the service information integrator and publisher processor;
    a service evaluation module processor configured for obtaining evaluation information for a service discovered by a Web server configured for allowing one or more search engines to discover the service based on the service definition file in the searchable service definition file storage, wherein the service evaluation module processor comprises a static component configured to support: browsing the service information, querying one or more services, and displaying the corresponding results on a user interface, wherein the service evaluation module processor further comprises a dynamic component configured to allow a user to enter service evaluation information, wherein the static component service evaluation module processor is configured for providing a mechanism to invoke said dynamic component of the service evaluation module processor;

a dynamic tool generator for dynamically generating the dynamic component of the service evaluation module processor based on input indicating the need for generating the dynamic component, wherein the dynamic tool generator is further configured for generating a user interface and related code for receiving service evaluation information from the user, wherein the generated code is configured for interacting with the service information integrator and publisher module processor to retrieve information related to the service and/or to store the information entered by the user;

wherein the service defined by the service definition file in the searchable service definition file storage can be discovered by a service customer utilizing general-purpose search engines via the Web server by providing the address of a corresponding storage area in the searchable service definition file storage, to the one or more search engine to access the storage area, wherein the service evaluation information can be discovered by the service customer by utilizing the service evaluation module processor.

10. The system of claim 9 wherein the service defined by the service definition file in the searchable service definition file storage can be discovered by a service customer utilizing general-purpose search engines via the Web server.

11. The system of claim 9 wherein the service publication tools module processor is further configured for obtaining invocation information for the service from the service provider.

12. The system of claim 11 wherein the service publication tools module processor is further configured for obtaining category information for the service.

13. The system of claim 9 wherein:

the service information integrator and publisher module processor is further configured for modifying a corresponding service description file in the searchable service definition file storage to reflect the service evaluation information.

* * * * *